United States Patent [19]
Morse

[11] 3,811,340
[45] May 21, 1974

[54] BELT GUARD

[76] Inventor: Glenn B. Morse, 321 Fountain St., N.E., Grand Rapids, Mich. 49506

[22] Filed: Nov. 13, 1972

[21] Appl. No.: 306,421

[52] U.S. Cl. .................................. 74/611, 144/1 C
[51] Int. Cl. ............................................ F16p 1/02
[58] Field of Search ...... 74/611, 609, 608; 144/1 C, 144/1 R; 408/20

[56] References Cited
UNITED STATES PATENTS
| | | | |
|---|---|---|---|
| 3,709,622 | 1/1973 | Morse | 408/20 |
| 1,232,881 | 7/1917 | Zuck et al. | 74/611 |
| 2,613,544 | 10/1952 | Cullman | 74/611 X |

Primary Examiner—Samuel Scott
Assistant Examiner—F. D. Shoemaker
Attorney, Agent, or Firm—Glenn B. Morse

[57] ABSTRACT

A belt Guard is supported by the spindle carrying one sheave engaged with the belt being guarded, and is also supported by an adjustable strut assembly interconnecting the guard with the machine frame supporting the spindle. This arrangement provides for angular adjustment of the guard about the spindle axis to accomodate various positions of a second sheave engaging the belt.

5 Claims, 8 Drawing Figures

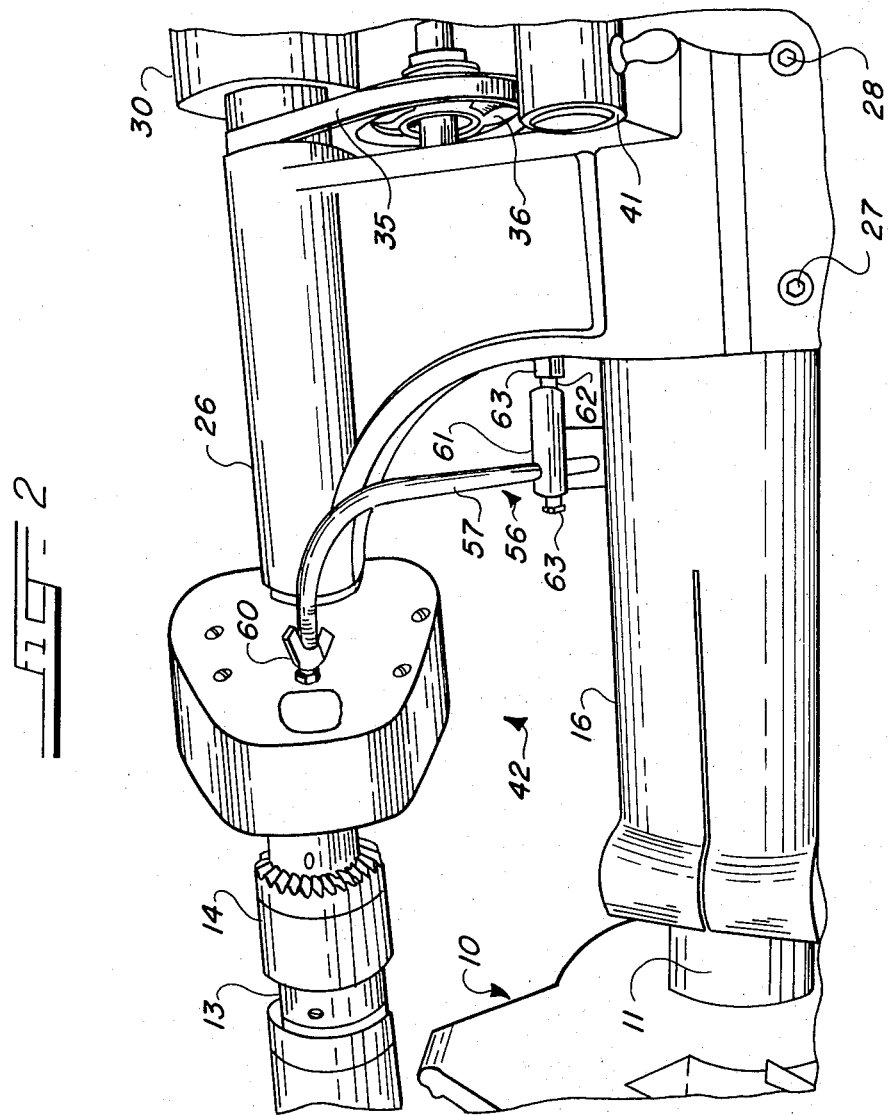
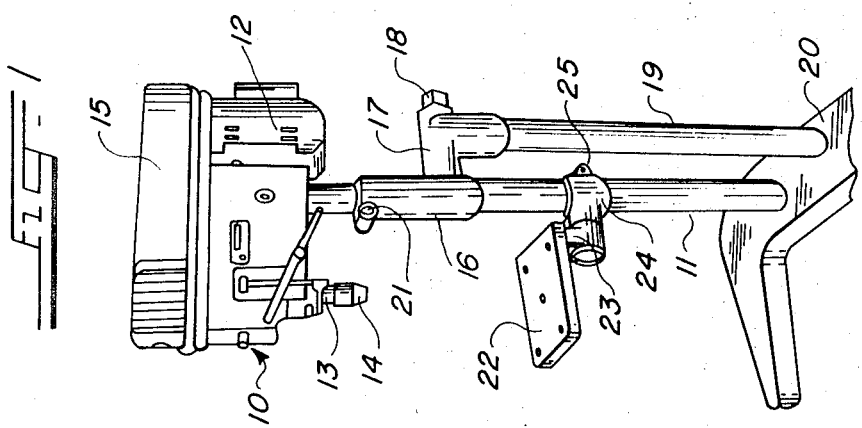

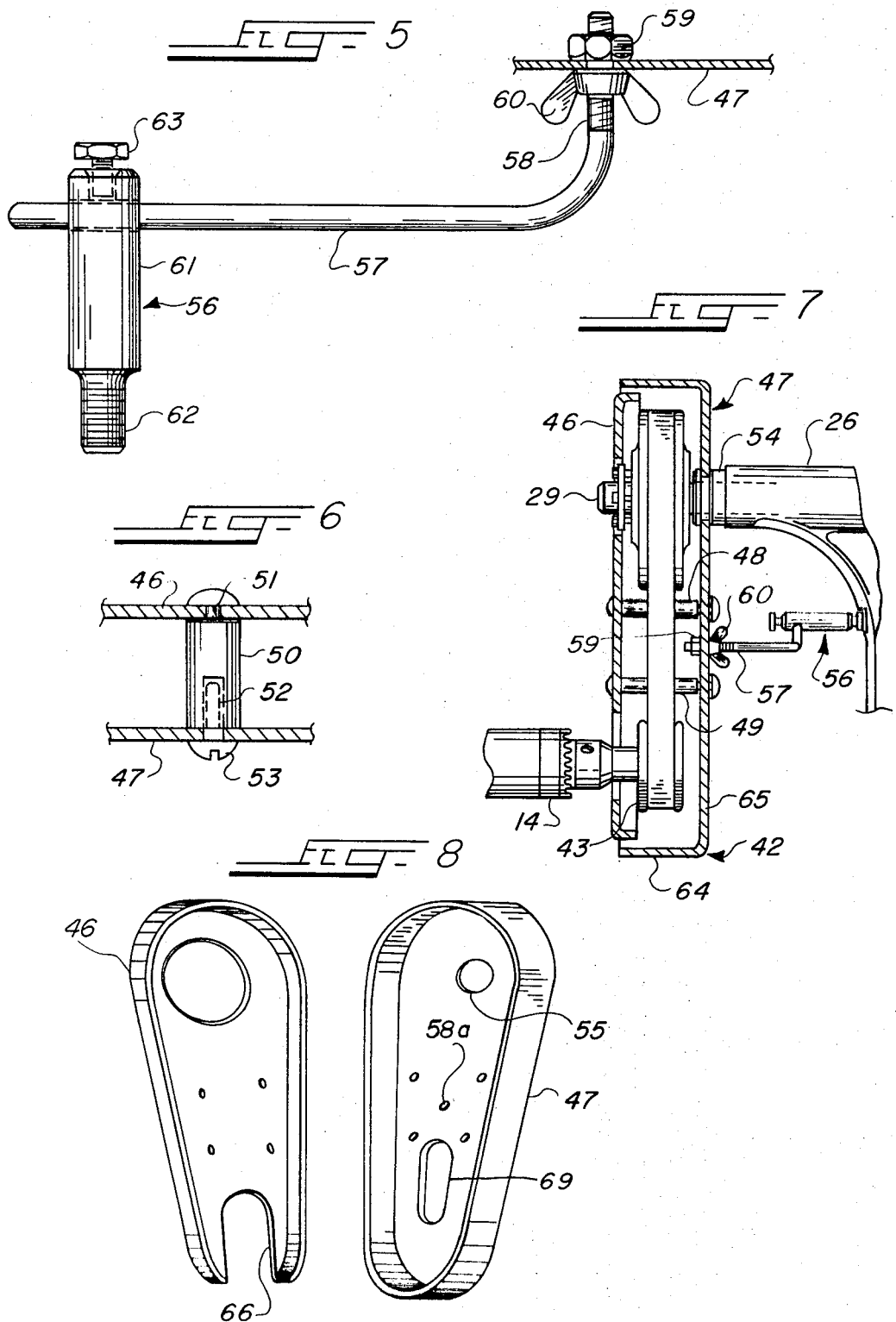

3,811,340

BELT GUARD

BACKGROUND OF THE INVENTION

Belt and chain drives are universally recognized as points of danger. Accidental disengagement of the belt or chain from one of the sheaves or sprockets will have a tendency to result in a violent slashing action of the chain or belt as it swings about the opposite sheave or sprocket. Another source of danger is the strong tendency for the chain or belt to entrap objects in the convergence area between the belt or chain and its sprocket or sheave. These dangers are commonly eliminated by surrounding the flexible power-transmission member and its associated carrying wheels with a housing. The support of the housing is a simple matter where the placement of both wheels carrying the flexible member is relatively fixed. In some applications, however, the placement of one of the wheels varies considerably with respect to the other requiring a considerable rotation of the housing about the axis of one of the sheaves to accomodate this variation. In other words, the variation causing the problem is one in which one of the wheels moves in a direction other than directly toward or away from the opposite wheel. The design problem is aggravated when there is a scarcity of intermediate fixed structure to which adjustable mounting supports can be attached.

SUMMARY OF THE INVENTION

A belt guard housing is supported by the spindle carrying one of the wheels protected by the guard, and is also supported by an adjustable strut interconnecting another point on the housing with a point on the frame of the machine carrying the spindle. The resulting adjustability, together with clearance openings in the housing for accommodating variations in the direct distance between the wheels carrying the flexible member, accomodates the practically infinite possible change in relative position of the power-transfer system. In the preferred form of the invention the housing is interposed between a sheave and the frame of the machine supporting the sheave spindle, thus eliminating any fastenings other than the strut to assure proper orientation of the guard assembly.

DESCRIPTIONS OF THE DRAWINGS

FIG. 1 is a perspective front quarter view of a modified drill press of a general type shown in the U.S. Pat. No. 2,963,057.

FIG. 2 is an enlarged front quarter perspective of a set of attachments applied to the machine shown in FIG. 1, which converts the machine to a lathe.

FIG. 5 is an enlarged framentary view showing the strut assembly.

FIG. 6 is an enlarged sectional view showing the spacers interposed between the two guard housing components.

FIG. 7 is a sectional view showing the assembled relationship of the belt guard components.

FIG. 8 is an exploded view showing the two guard housing components separated, and without spacers.

DESCRIPTION OF THE PREFERRED EMBODIMENTS

Figure 3:
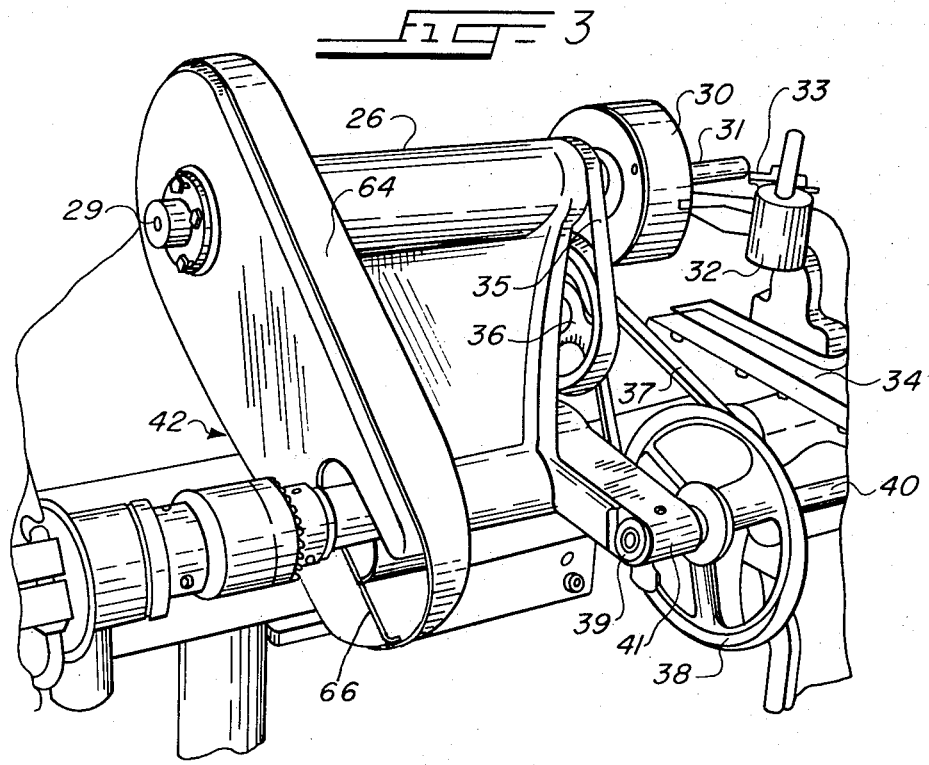
FIG. 3 is a front quarter perspective from the opposite side of that of FIG. 2, and from a position above that of FIG. 2.

The modified drill press shown in FIG. 1 has a power head generally indicated at 10 mounted on the cylindrical front column 11. The power head includes a motor 12 and a spindle 13 carrying a chuck 14, with the motor providing power to the spindle by a belt and sheave system concealed beneath the hood 15.

The column 11 is rotatable and slidable axially in the clamping member 16, which has a horizontal shaft (not shown) traversing the fulcrum member 17, and terminating in the nut 18. Tightening of the nut 18 will determine the degree of resistance to rotation of the column 11 with respect to the fulcrum member 17. A rear column 19 extends from the fulcrum member 17 to the U-shaped base 20 to form a stand capable to supporting the column 11 and the components associated with it in the erect position shown in FIG. 1 and in the horizontal position shown in FIGS. 2 and 3. In either of these positions, the power head and column can be adjusted axially and rotatively with respect to the column axis, and is secured in the adjusted position by tightening the clamping bolt 21 which constricts the upper portion of the clamping member 16 about the column 11. A table 22 has an offset extension 23 adjustably secured to the table bracket 24 for rotation about an axis perpendicular to the axis of the column 11. The adjusted position rotatively and axially with respect to the column 11 can be locked by tightening the clamping bolt 25, which constricts the bracket 24 about the column 11.

FIGS. 2 and 3 illustrate a set of attachments that can be applied to the basic machine shown in FIG. 1 to provide the functions of lathe, and the resulting machine presents conditions typical of those appropriate for the belt guard structure shown in FIGS. 5 through 8. A head stock frame 26 is slipped on to the column 11 in place of the table 22 and bracket 24, when the column 11 has been placed in a horizontal position. Tightening of the clamping bolts 27 and 28 secures the position of the head stock frame 26 with respect to the column 11. The head stock frame 26 carries a machine spindle 29 (refer to FIG. 3) carrying the machine chuck 30 for holding work pieces as shown at 31. A tool support 32 carries a cutting tool 33, and is mounted on a carriage assembly generally indicated at 34. A power-transfer system driving an automatic feed includes the belt 35 engaging a small sheave carried by the spindle 29, and extending to the idler 36. The idler drives a small sheave carrying a belt 37, which also engages the larger sheave 38 rotatively secured to the running nut 39. This nut is in threaded engagement with a feed screw 40, and is rotatively supported at the outer extremity of the arm 41. This structure forms no part of the present invention, and is described as typical of a machine environment in which a belt guard assembly of the type generally indicated at 42 is extremely valuable. These components are described in my application for U.S. Pat. Ser. No. 47,774 filed Nov. 12, 1970, now U.S. Pat. No. 3,709,622 dated Jan. 9, 1973.

A driving sheave 43 is mounted on a stub shaft (not shown) carried by the drill press chuck 14, and power is transferred to the machine spindle 29 from the sheave 43 by the belt 44 and the sheave 45 secured to the machine spindle 29. An operator standing in front of the machine, as viewed in FIG. 3, is thus in a position of some danger, particularly if the rotative speed of the machine is at all high. Accidental disengagement of the belt 44 from the sheave 45 can cause the belt to whip around with the driving sheave 43 with very considerable force. There is also a serious danger that the operator's fingers or clothing might become entrapped in the convergence between the belt 44 and the driving sheave 43. The guard assembly 42 is a protection against these possibilities. This assembly includes an inner housing component 46 and an outer housing component 47 separated by spacers as shown at 48 and 49 in FIG. 7 and shown in greater detail in FIG. 6. These spacers are preferably short lengths of rod 50 with a portion of reduced diameter 51 at one end which is inserted through the wall of the inner housing component 46, and headed over in the matter of a rivet, as shown in FIG. 6. The opposite end of these lengths of rod has an internal thread as shown at 52 for receiving a screw 53 traversing the wall of the outer housing component 47.

The outer housing component 47 has a collar 54 traversing the hole 55, and the collar is preferably secured firmly to the outer housing component either through the use of a press fit at this junction, or by welding, soldering, or brazing. The collar 54 has a running fit with the machine spindle 29, with the result that this interengagement provides a support for the outer housing component 47, but leaves the housing rotatable about the machine spindle 29 unless additional support is provided. This additional support is provided by the adjustable strut assembly indicated at 56, and shown in detail in FIG. 5. An L-shaped rod 57 has its shorter leg threaded at 58 to receive the interior nut 59 and the exterior wing nut 60. The portion 58 traverses a suitable hole in the outer housing 47 shown at 58a in FIG. 8. The use of the wing nut 60 makes it possible to loosen the interengagement with the housing 47 for purposes of re-positioning the housing assembly about the axis of the machine spindle 29.

The opposite end of the rod 57 has a slip fit with a transverse hole in the post 61. One end of this post is threaded as shown at 62, and is normally in threaded engagement with a threaded hole in the machine frame 26. The position of the post 61 (and consequently the position of the hole receiving the rod 57) can be adjusted by the degree of threaded interengagement of the portion 62, which is locked by the lock nut 63 shown in FIG. 2. The post is then secured angularly and axially in a position determined by the position of the rod 57, which corresponds to the desired adjusted position of the housing assembly 42. The assembly shown in FIG. 5 can be adjusted as to length between the axis of the threaded portion 62 and that of the threaded portion 58 by loosening the clamping screw 63, which traverses an axially threaded hole in the end of the post 61, which intersects the hole receiving the rod 57. Once the adjusted position of the assembly has been determined, the bolt 63 is tightened to secure this relationship.

The need for variation of this adjustment results from the belt-adjustment feature inherent in the structure shown in FIGS. 2 and 3. The belt 44 can be loosened or tightened by relative rotation of the power head 10 with respect to the machine frame 26 obtained by loosening the clamping bolts 21, 27, and 28. The difficulty of accurately predicting what the final assembled position of the guard 42 should be, makes the adjustable strut assembly shown in FIG. 5 extremely useful.

Figure 4:
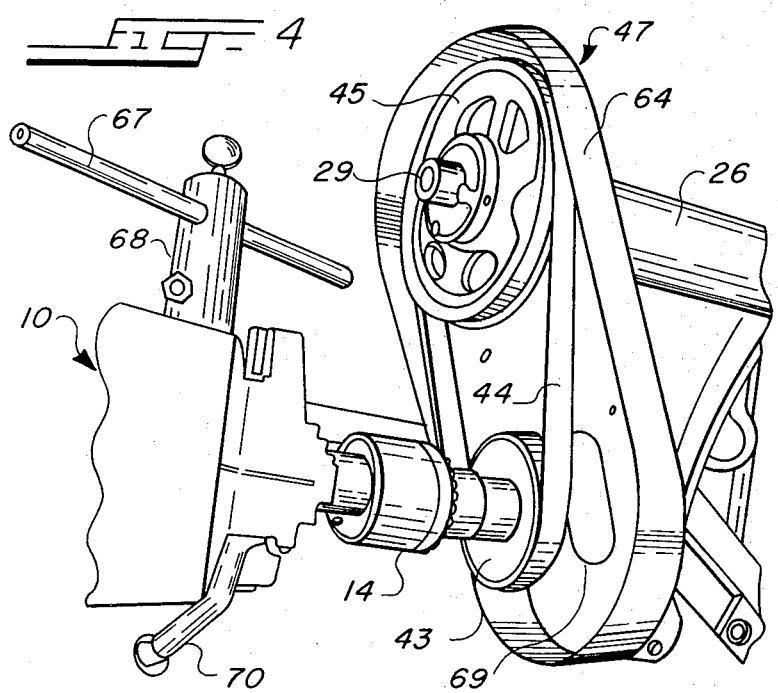
FIG. 4 is a view from a position similiar to that of FIG. 3, with one of the belt guard housing components removed, and with the driving sheave axially retracted.

FIG. 4 illustrates the manner in which the belt 44 may be installed and removed from the outer housing component 47 after it is fully installed. Incidentally, it is obvious that the outer housing component 47 can be used alone, and will provide a major portion of the total protection. The addition of the inner housing 46 is preferable, but not vital. The presence of the peripheral flange 64 surrounding the path of the belt 44 tends strongly to prevent the escape of the belt under any circumstances. The presence of the panel 65 forming the back of the outer housing 47 also tends to eliminate the possibility of accidental entrapment of clothing, fingers, or miscellaneous objects from the convergence of the belt with the driving sheave 43, particularly since the panel 65 is on the operator's side of the guard assembly. Installation and removal of the belt 44 is preceded by the removal of the inner housing component 46 through removal of the screws 53. This permits the inner housing component 46 to be moved to the left, as shown in FIG. 7, and then upwardly out of engagement with the assembly, as a result of the provision of the slot 66 shown in FIG. 8 and intersecting the end of this component. Once the inner housing component 46 has been removed, the feed handle 67 of the drill press power head can be rotated about the axis of its shaft 68, resulting in the withdrawal of the spindle and chuck 14 axially to the left as shown in FIG. 4. This movement is characteristic of any drill press assembly, and is associated with the feeding movement used in drilling operations. This movement, in the structure shown in FIG. 4, results in movement of the driving sheave 43 out of the confines of the outer housing 47 to the extent that the belt 44 becomes easily accessible. The clamping bolts securing the relative position of the machine frame 26 and the power head 10 are then loosened to the point that the power head can be rotated upwardly with respect to the machine frame, as viewed in FIG. 4, resulting in movement of the driving sheave 43 toward the driven sheave 45. This loosens the belt 44 to the point that it can be detached easily. The same adjustability also provides a belt-tensioning system, when conducted in the reverse from the procedure outlined above. The clearance opening 69 in the outer housing is preferably incorporated to accomodate the hub on the driving sheave 43 in the event that it becomes desirable for one reason or another to extend the hub in a direction opposite from that of a chuck 14. When the machine is being prepared for use, and the driving sheave 43 is placed in a relationship with the driven sheave 45 by manipulation of the handle 67, the adjusted position can be locked by the clamp 70 which secures the quill assembly of the drill press in the usual manner.

I claim:

1. In combination with a machine having a headstock frame, a spindle rotatably mounted in said frame, and sheave means mounted on said spindle, said machine also having drive means for said spindle including a power head and a driving sheave normally carried by said power head, and also including belt means normally interengaged with said sheaves in power-transfer relationship, a guard assembly for said belt means and sheaves comprising:

means forming a bearing ring carried by said spindle and rotatable with respect thereto;

a first guard housing element having an opening normally traversed by said spindle, said first guard housing element being secured to said ring;

stabilizing means securing said first guard housing element against rotation with respect to said frame; and a second guard housing element normally disposed with respect to said first guard housing element to define therewith an enclosure for said belt means and sheaves, and further including means attaching said guard housing elements together at positions remote from said belt means.

2. A combination as defined in claim 1, wherein said guard elements are normally telescopically interengaged.

3. A combination as defined in claim 1, wherein said second guard element has an open end adapted to receive portions of said driving sheave.

4. A combination as defined in claim 3, wherein said power head is moveable with respect to said frame in a manner to increase and decrease the distance between said sheaves, said power head being on the opposite side of said belt means from said first guard housing element.

5. In combination with a machine having a headstock frame, a spindle rotatably mounted on said spindle, said machine also having drive means for said spindle including a power head and a driving sheave normally carried by said power head, and also including belt means normally interengaged with said sheaves in power-transfer relationship, a guard assembly for said belt means and sheaves comprising:

means forming a bearing ring carried by said spindle and rotatable with respect thereto;

a guard housing element having an opening normally traversed by said spindle, said guard housing element being secured to said ring; and stabilizing means securing said guard housing element against rotation with respect to said frame, said stabilizing means including an adjustable strut assembly interconnecting said guard housing element and said frame at a position remote from said spindle.

* * * * *